United States Patent Office 2,967,173
Patented Jan. 3, 1961

---

2,967,173

POLYMERIZABLE ESTERS OF ACRYLIC AND METHACRYLIC ACID AND POLYMERS THEREOF

James C. Fang, Sharon Hill, Pa., assignor to E. I. du Pont de Nemours and Company, Wilmington, Del., a corporation of Delaware No Drawing. Filed Mar. 22, 1956, Ser. No. 573,094

19 Claims. (Cl. 260—77.5)

This invention relates to polymerizable esters of acrylic and methacrylic acids and to homopolymers and copolymers thereof.

The polymerizable monomeric esters of this invention have the general formula:

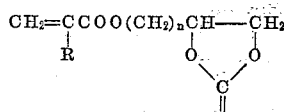

in which R is H or $CH_3$ and $n$ is an integer having a value of 1 to 4 inclusive. Thus they are the acrylic or methacrylic acid esters of the cyclic carbonates of the alpha, beta, omega alkane-triols which contain 3 to 6 carbon atoms in the alkane chain, i.e. glycerol to 1,2,6-hexanetriol.

The esters of this invention readily polymerize by vinyl or addition polymerization through the terminal $CH_2=C<$ group to form homopolymers or, when other $CH_2=C<$ containing monomers are included, the corresponding copolymers.

The esters of this invention can be prepared from acrylic or methacrylic acid, or a lower alkyl ester thereof, and the cyclic carbonate of an alkane triol in accordance with the general esterification reaction:

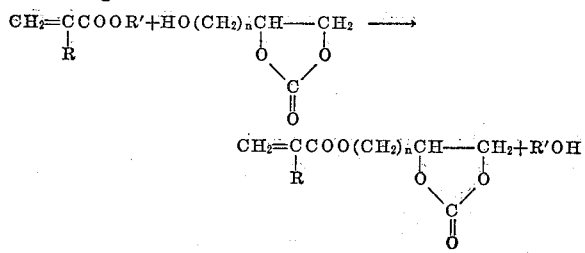

in which R' is H, $CH_3$, $C_2H_5$, $C_3H_7$ or $C_4H_9$, the preferred form of R' being $CH_3$ or $C_2H_5$.

The preferred acrylic compounds for use in the above reaction are methyl acrylate, methyl methacrylate, ethyl acrylate and ethyl methacrylate.

The cyclic carbonates of the alkane triols used in the above reaction are available on the market or can be prepared by known methods, such as by careful reaction of the alkane triol with a cyclic alkylene carbonate, such as ethylene carbonate.

The esterification reaction mentioned above is carried out at an elevated temperature, preferably a temperature above the boiling point of the reaction mixture but below the boiling point of the desired product so that the by-product, R'OH, can be removed by distillation, thus forcing the reaction to completion. A convenient method involves using an excess of a lower alkyl acrylate and distilling off a mixture thereof with the R'OH alcohol, whereby a maximum conversion of alkane triol carbonate to the desired ester is obtained. The reaction is carried out preferably in the presence of an esterification catalyst, e.g. an alkali metal alkoxide, oxide, hydride, or hydroxide or litharge, and a polymerization inhibitor, e.g. phenothiazine, hydroquinone, tertiary butyl catechol, or various amines.

The esterification reaction is carried out preferably as a high concentration mass reaction in the absence of inert diluents, but it can be done in the presence of an inert solvent like dioxane.

Following the esterification reaction, purification can be carried to the desired degree, preferably by fractional distillation under reduced pressure whereby a crude ester of this invention having a wide boiling range can be obtained or a substantially pure product having a narrow boiling range can be obtained. For example, either a crude methacrylate ester of glyceryl carbonate having a boiling range of about 115°–130° C. at 0.3–0.4 mm. Hg or a substantially pure ester having a boiling range of about 119°–121° C. at 0.1 mm. Hg can be obtained as desired. Volatile polymerization inhibitors which distill over with the ester can be removed by well-known means if desired.

In all of the process steps involved in making the esters of this invention, the temperatures should be kept below the point where pyrolysis, yielding $CO_2$, is encountered. Sub-atmospheric pressure is a convenient means of avoiding high temperatures.

The esters of this invention can be polymerized by known methods applicable to vinyl and acrylic type monomers. Polymerization can be carried out in bulk, solution, suspension or emulsion; in the presence or absence of well-known proportions of well-known polymerization catalysts e.g. benzoyl peroxide, tertiary butyl hydroperoxide, tertiary butyl perbenzoate, alpha,alpha'-azobis(isobutyronitrile), per salts like potassium persulfate, the redox catalyst systems, and benzoin in the presence of ultraviolet light; and in the presence or absence of one or more other $CH_2=C<$ containing monomers. Examples of such other monomers are the alkyl esters of acrylic or methacrylic acid such as methyl methacrylate, ethyl acrylate, octyl acrylate and benzyl acrylate; acrylamides such as methacrylamide; vinyl esters such as vinyl chloride and vinyl acetate; vinylidene chloride; acrylonitrile; allyl compounds such as diallyl adipate; vinyl aryl compounds such as styrene and divinyl benzene; and other unsaturated compounds like butadiene and maleic anhydride. All of these monomers do not necessarily copolymerize with the new esters of this invention in all proportions of such monomer to new ester. However, the copolymers of this invention can be made to contain from a very small but effective amount of a new ester of this invention, e.g. the order of 0.5% or 1.0%, to almost entirely new ester, e.g. the order of 99% or 99.5%, the percentages representing the amount of new ester based on the total material copolymerized.

It is to be understood that copolymers can also be made from a mixture of two or more of the new esters with or without additional monomers or from only one new ester with two or more other monomers.

It is likewise to be understood that the homopolymerization or copolymerization of the products of this invention can be controlled and the character of the processes can be varied by techniques well-known in the addition polymerization art. For example, in solution polymerization the solvent can be selected from hydrocarbons, ketones, esters and the like, or mixtures thereof, so that the resulting polymer remains in solution or precipitates out of solution as it is formed, depending upon the results desired. Also, for example, in aqueous emulsion or suspension polymerization, an emulsifying agent can be selected from fatty acid soaps, fatty acid esters of polyalkylene glycol modified polyhydric alcohols, sulfonated alcohols, amine salts and the like, or mixtures thereof. Also other additives like pH-controlling agents can be used.

Various modifiers like plasticizers, pigments and dyes can be added before, during, or after polymerization.

The following examples illustrate the practice of this invention, but it is not limited thereby. Unless otherwise specified, the parts and percentages are by weight.

Example 1

| | Parts by wt. |
|---|---|
| Glyceryl carbonate | 236 |
| Methyl methacrylate | 150.0 |
| Hydroquinone | 3 |
| Sodium methoxide (sodium methylate) | 25 |

These components were mixed thoroughly and were placed in a reaction vessel equipped with an agitator, thermometer, nitrogen inlet, and a combination fractioning column, take-off head, and condenser vented to the atmosphere. The system was swept with nitrogen, and a slow stream of nitrogen was passed through the apparatus during the remainder of the process.

The charge was refluxed (liquid temperature approximately 100°–102° C.) for about 4.5 hours. Then methyl alcohol was distilled off with unreacted methyl methacrylate until the distillate was substantially free of methyl alcohol, as indicated by refractive index measurements. This required about two hours, during which the temperature rose to about 106° C.

The resulting solution was subjected to a vacuum (approximately 20 mm. Hg) and was carefully heated to drive off unreacted methyl methacrylate.

The residue was dissolved in benzene and was washed several times with 30% aqueous $CaCl_2$ to remove unreacted glyceryl carbonate and then several times with 15% aqueous NaOH to remove the hydroquinone. Finally the benzene was removed by vacuum distillation, yielding about 200 parts of crude methacrylate ester of glyceryl carbonate.

The crude was purified by adding 2 parts of hydroquinone and distilling under vacuum. The purified portion boiling between 116° C. at 0.3 mm. Hg and 131° C. at 0.4 mm. Hg was retained. Most of this product had a boiling range of 119°–121° C. at 0.1 mm. Hg. The hydroquinone was removed by dissolving the product in ethylene chloride and hexane, washing with 10% aqueous NaOH, and finally removing the solvent by vacuum distillation. The product was identified as predominantly methacrylate ester of glyceryl carbonate by analysis (found 50.50% C, 6.23% H, 43.27% O; theoretical 51.60% C, 5.37% H, 43.03% O).

Example 2

A homopolymer of the methacrylate ester of glyceryl carbonate was prepared by refluxing a 50% solution of this ester in methyl ethyl ketone for a few minutes at about 73° C. under a nitrogen atmosphere. An insoluble, white, brittle polymer was formed. This was dried and was found also to be insoluble in acetone, dimethyl formamide, glycerol carbonate and propylene carbonate.

Examples 3–6

Copolymers of the methacrylate ester of glyceryl carbonate and various other monomers containing the $CH_2=C<$ group were prepared by placing the following charges in separate vessels, covering with a nitrogen atmosphere, sealing, and tumbling in a water bath at 85° C. for 16 hours:

| Example | Parts by Weight | | | |
|---|---|---|---|---|
| | 3 | 4 | 5 | 6 |
| Methacrylate ester of glyceryl carbonate | 1 | 15 | 10 | 20 |
| Styrene | 99 | | | |
| Methyl methacrylate | | 15 | | |
| Methyl acrylate | | 20 | | |
| Acrylonitrile | | | 80 | |
| Butadiene | | | | 5 |
| Toluene | 100 | 50 | | |
| Distilled water | | | 100 | 25 |
| Potassium persulfate ($K_2S_2O_8$) | | | 1.0 | 0.25 |
| Alpha, alpha'-azobis(isobutyronitrile) | 1.0 | 0.5 | | |
| Sodium lauryl sulfate | | | 5 | 1.5 |

Examples 3 and 4 illustrate polymerization in solution. The copolymer of Example 3 remained soluble in the toluene and yielded a syrupy solution, which was useful without further modification as a clear coating composition. The copolymer of Example 4 was insoluble in the toluene and occurred as a particulate precipitate.

Examples 5 and 6 illustrate polymerization in aqueous emulsion. The resulting copolymers occurred as particulate precipitates.

The processes, the ingredients and the proportions used in these examples can be varied as previously described.

The acrylate analog (referring to the general formula; R is H, $n=1$) of the product of Example 1 is prepared by substituting an equivalent amount of a lower alkyl acrylate, preferably methyl acrylate or ethyl acrylate, for the methyl methacrylate in Example 1. The resulting product can be used in polymerization processes, as in Examples 2–6, to provide a homopolymer and copolymers of this invention.

The 1,2,6-hexanetriol analog (referring to the general formula; R is $CH_3$, $n=4$) of the product of Example 1 is prepared by substituting an equivalent amount of the carbonate of 1,2,6-hexanetriol, i.e.

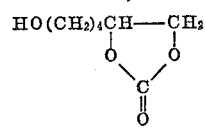

for the glyceryl carbonate in Example 1. The resulting product can be used in polymerization processses, as in Examples 2–6 to provide a homopolymer and copolymers of this invention.

Likewise, the other polymerizable esters of this invention, in which R is H or $CH_3$ and $n=1$, 2, 3 or 4, can be made by using the appropriate ingredients in the general process illustrated by Example 1, which obviously can be modified to use acrylic or methacrylic acid in place of an ester thereof. All of the resulting esters can be used in polymerization processes, as illustrated in Examples 2–6, to provide homopolymers and copolymers of this invention.

Since the esters of this invention are readily polymerizable, it is preferred to have present during manufacture and storage enough of an inhibitor, such as hydroquinone, tertiary butyl catechol, pyrogallol and the like, to prevent an undesirable amount of polymerization. The inhibitor can be removed or inactivated, if desired, before the esters are polymerized. However small amounts of inhibitor can be tolerated, or may even be desirable, in some polymerization processes.

By varying catalyst concentration, temperature, ratio of monomers to each other, ratio of monomers to inert solvent or dispersion medium, and similar controlling factors, homopolymers and copolymers of this invention can be made to have a wide range of physical and chemical properties. The polymers are suitable for use in clear and pigmented coating compositions (solution and dispersion types), adhesives, and molding and casting resins. The polymers can be foamed and/or crosslinked by pyrolyzing, whereby carbon dioxide is split off. The polymers can also be crosslinked by treating, e.g. by heating, with polyfunctional compounds capable of reacting with the

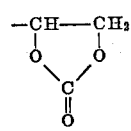

structure such as dihydroxy, dicarboxy, and diamine compounds.

The new esters of this invention are also useful as chemical intermediates. For example, glycidyl methacrylate can be made by pyrolyzing the methacrylate ester of glyceryl carbonate under carefully controlled conditions, preferably in the presence of a polymerization inhibitor, and analogous reactions can be carried out with the other new esters of this invention.

The preferred new esters of this invention are the acrylate and the methacrylate of glyceryl carbonate, largely for economic reasons; and the preferred homopolymers and copolymers are those derived from these two esters.

Many widely different embodiments of this invention can be made without departing from the spirit and scope thereof. Therefore it is not intended to be limited except as indicated in the appended claims.

The embodiments of this invention in which an exclusive property or privilege is claimed are:

1. A polymerizable ester having the general formula:

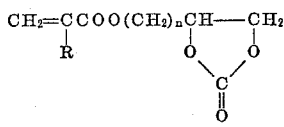

in which R is a member of the class consisting of H and $CH_3$ and in which $n$ is an integer having a value of 1 to 4, inclusive.

2. A polymerizable ester having the formula:

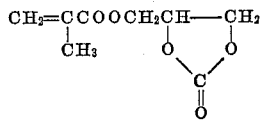

3. A polymerizable ester having the formula:

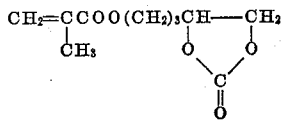

4. A polymerizable ester having the formula:

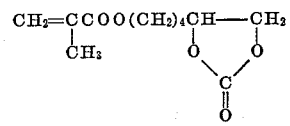

5. A polymerizable ester having the formula:

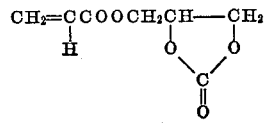

6. A polymerizable ester having the formula:

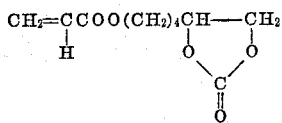

7. A homopolymer of an ester of claim 1.
8. A homopolymer of an ester of claim 2.
9. A homopolymer of an ester of claim 3.
10. A homopolymer of an ester of claim 4.
11. A homopolymer of an ester of claim 5.
12. A homopolymer of an ester of claim 6.
13. A copolymer of an ester of claim 1 and another polymerizable compound containing the $CH_2=C<$ group.
14. A copolymer of an ester of claim 2 and another polymerizable compound containing the $CH_2=C<$ group.
15. A copolymer of an ester of claim 3 and another polymerizable compound containin gthe $CH_2=C<$ group.
16. A copolymer of an ester of claim 4 and another polymerizable compound containing the $CH_2=C<$ group.
17. A copolymer of an ester of claim 5 and another polymerizable compound containing the $CH_2=C<$ group.
18. A copolymer of an ester of claim 6 and another polymerizable compound containing the $CH_2=C<$ group.
19. A compound of the formula

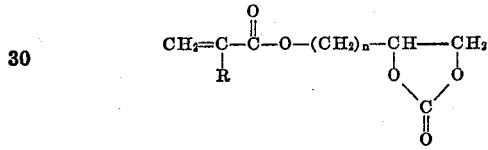

wherein R is a member of the class consisting of a hydrogen atom and a methyl group and $n$ is an integer having a value from one to four, inclusive.

References Cited in the file of this patent

UNITED STATES PATENTS

| | | |
|---|---|---|
| 2,384,124 | Muskat et al. | Sept. 4, 1945 |
| 2,511,942 | Prichard | June 20, 1950 |
| 2,522,680 | Kropa et al. | Sept. 19, 1950 |
| 2,524,432 | Dorough | Oct. 3, 1950 |

OTHER REFERENCES

Brunson et al.: Journal American Chem. Soc., vol. 74 (1952), pp. 2100-1.

UNITED STATES PATENT OFFICE
CERTIFICATION OF CORRECTION

Patent No. 2,967,173                                        January 3, 1961

James C. Fang

It is hereby certified that error appears in the above numbered patent requiring correction and that the said Letters Patent should read as corrected below.

Column 3, line 6, for "150.0" read -- 1500 --.

Signed and sealed this 16th day of May 1961.

(SEAL)
Attest:

ERNEST W. SWIDER                                                   DAVID L. LADD
Attesting Officer                                                        Commissioner of Patents